United States Patent [19]

Willmore et al.

[11] Patent Number: 4,528,445
[45] Date of Patent: Jul. 9, 1985

[54] HEAD FOR OPTICAL CARD READER

[75] Inventors: James A. Willmore, Eden Prairie, Minn.; Henry L. Miszkiewicz, Cardiff, Calif.

[73] Assignee: Opto Systems Incorporated, San Diego, Calif.

[21] Appl. No.: 438,938

[22] Filed: Nov. 3, 1982

[51] Int. Cl.³ .............................................. G06K 7/12
[52] U.S. Cl. .................................... 235/469; 235/454
[58] Field of Search ................................ 235/469, 454

[56] References Cited

U.S. PATENT DOCUMENTS 3,643,066  2/1972  Coliz ................................... 235/469
4,047,023  9/1977  Key ..................................... 235/469

Primary Examiner—Harold I. Pitts
Attorney, Agent, or Firm—Schroeder, Siegfried, Vidas & Arrett

[57] ABSTRACT

This invention is directed to an optical card reader in which the cards to be read have a format arranged in columns and rows. A row of timing marks or slots is formed in the card for each column of data. The card is driven past a read head block that directs the light to the card in which the reflected light is received through a shaped aperture or orifice so that a positive indication of the marked area is detected. The signal is applied to an operational amplifier for further treatment. There are a plurality of light sources and sensors transversely arranged in the read head block.

6 Claims, 5 Drawing Figures

U.S. Patent    Jul. 9, 1985    4,528,445
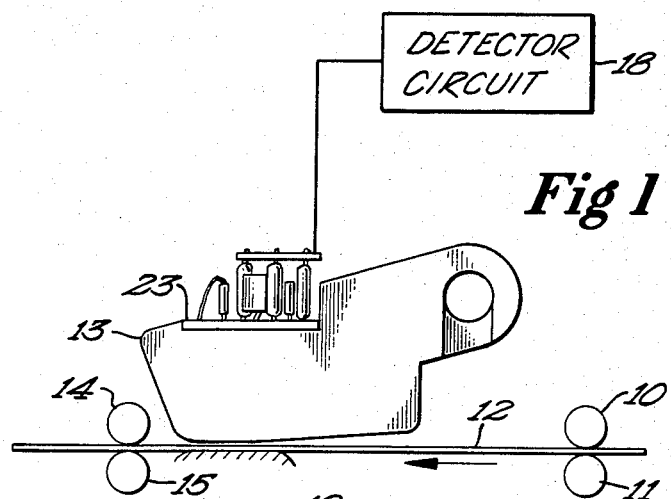
Fig 1
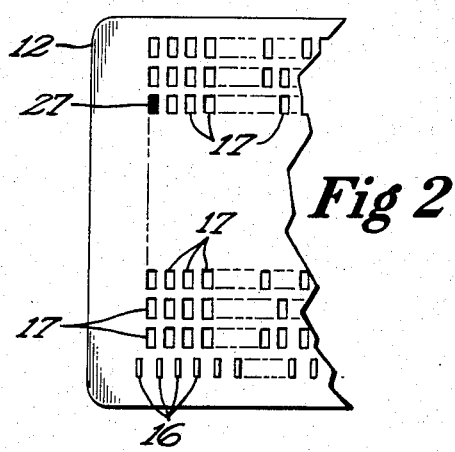
Fig 2
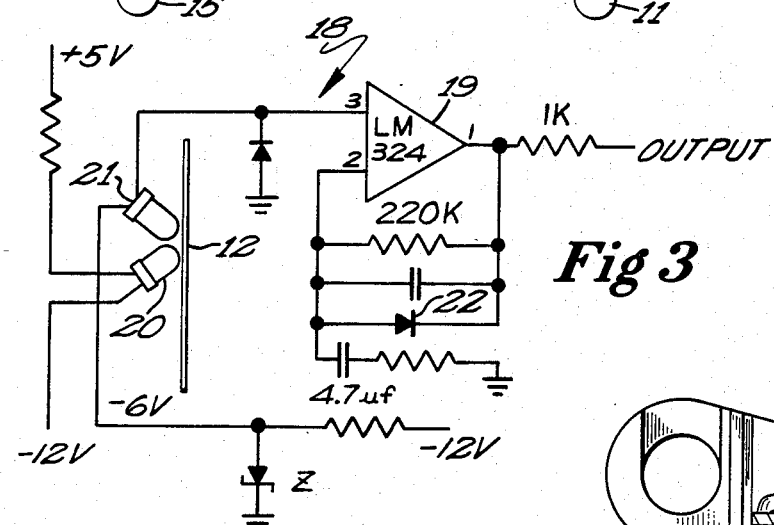
Fig 3
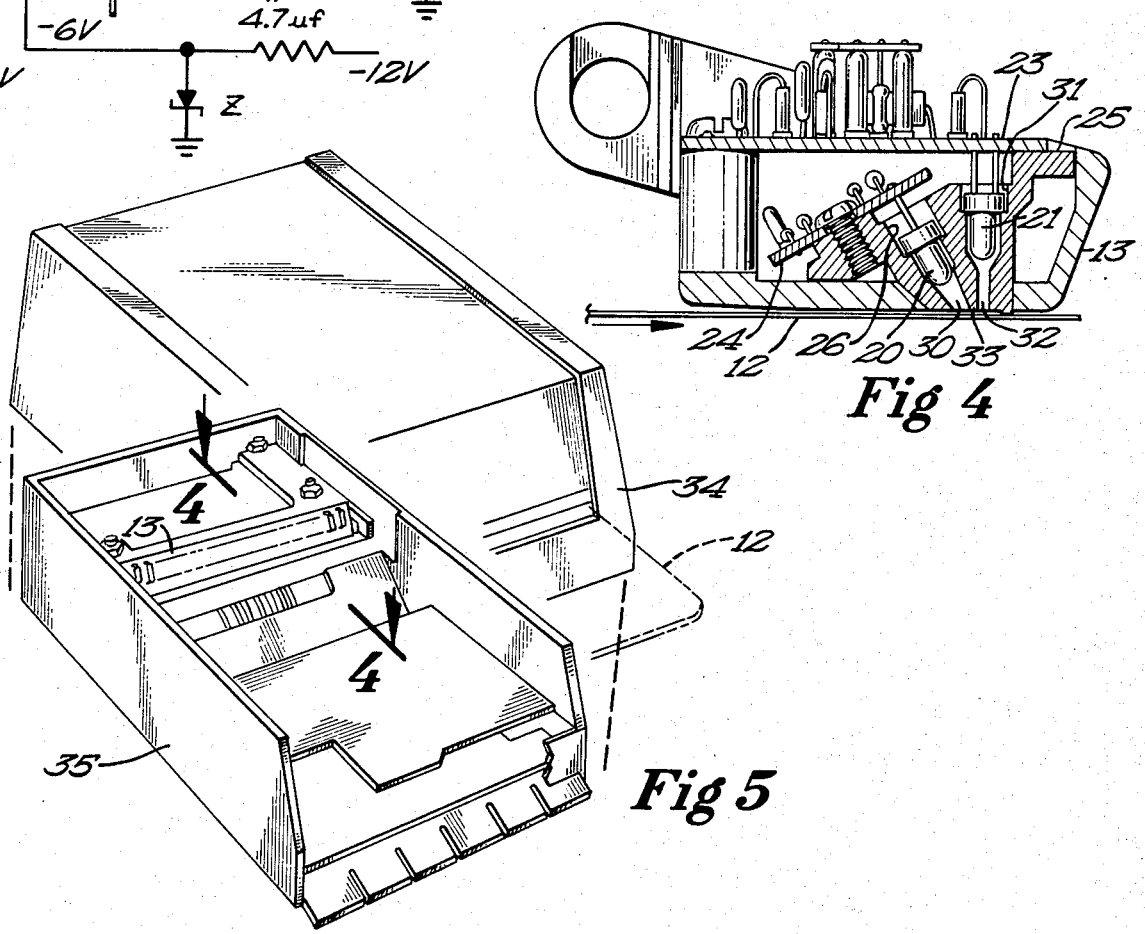
Fig 4
Fig 5

HEAD FOR OPTICAL CARD READER

DESCRIPTION

Brief Description of the Invention

This invention relates to a data card reader and more particularly to reading the marks or slots on a card.

The data card reader of this invention makes use of light emitting diodes and phototransisters which are arranged in pairs. Each pair of light emitting diodes and phototransisters are focused on a rectangular aperture that is suitably positioned to be used with a data card as it passes through the optical card reader. There are a plurality of apertures and sensors that are disposed in a transverse line to read the face of the card in a read head block. The light emitting diodes and phototransisters are arranged so as to prevent cross-talk between the transverse stages and thus baffles and shields are eliminated. That is, certain of the prior art makes use of a series of shields placed around a lens that extends transverse to the movement of the card. Such an arrangement may be found in U.S. Pat. No. 3,904,110 where baffles are used to separate the rows on the card. With the present invention employed, a viewing area of the phototransister sensors is highly defied and limited to a data bit formed on the card while interference from other light emitting diodes is eliminated.

The card which has some 12 rows plus strobe of data contained therein is propelled past the optical sensors at a rate of approximately eight inch per second.

One of the general problems in designing a data reader is to make the reader highly accurate while reading closely packed data that is submitted on the card. For instance, where the data appears on the cards in columns and rows, one column is usually read at a time. A narrow timing mark which is generally positioned between the data mark triggers the reading of the sensors. For that reason, the timing mark is made very narrow so that reading will not take place until the read heads are approximately in the center of the data marked on the card or punched in the card. Because the timing mark is very narrow, it is possible to miss the timing mark and if there is any variation in the light being emitted, an additional problem is produced. If the timing mark is made larger to insure detecting it, it creates an unprecise coordination of positioning the sensor. One such means of eliminating the problem is through the use of baffles used in conjunction with a lens as described previously. However, it has been found, that by appropriately defining the slot areas through which the light passes to the card, that is the reflected light, accurate readability may be attained.

It has also been found that a capstan roller is required to engage the card and propel it through the card reader at a uniform rate of speed. Coupling this with the light emitting diodes and phototransisters, screen to prevent unwanted cross-talk can provide a reliable optical card reader.

It is therefore a general object of this invention to provide an optical card reader having a read head block using a unique light passage mechanism.

It is yet a further object of this invention to provide an optical reader having a capability to read extremely small marks on a data card.

It is still a further object of this invention to provide an optical reader having a capability to read both marked and punched areas of a data card.

It is still another object of this invention to provide an optical reader in which the reading capability has been increased through the relationship of the bores in the read head.

BRIEF DESCRIPTION OF THE DRAWINGS

A detailed description of one preferred embodiment of the head for optical card reader is hereafter described with specific reference being made to the drawings in which:

FIG. 1 is a side view of the data card optical read head in combination with other elements of the invention;

FIG. 2 is a partial plan view of the data card that is used with the optical read head;

FIG. 3 is a schematic view of the associated electronics used with each channel being read by the optical read head;

FIG. 4 is a sectional view of the optical read head forming a portion of the invention and taken along lines 4—4 of FIG. 5; and FIG. 5 is a perspective view showing a broken away portion of the optical read head of the invention.

PREFERRED EMBODIMENT

As disclosed in FIG. 1, a pair of rollers 10 and 11 engage a card 12 and move it past an optical card reader 13. That is, rollers 10 and 11 propel card 12 to the left where the card is engaged by another pair of rollers 14 and 15 to continuously move the card to the left. Card 12 is shown in more detail in FIG. 2 wherein there are a plurality of timing marks 16 that are arranged in a row near the edge of card 12 and they are disposed intermediate the columns of other markable areas 17 which may be imprinted by a pencil or may be punched to give a definite change in the markable area. That is, the lower row 16 is used as the timing marks and the other rows are used as the data marks. The card disclosed in FIG. 2 moves to the left. Thus when a mark is placed within the box 17 it must be capable of being detected, even though only a small portion of the markable box is covered with a code mark. Additionally, the marks within the box may not all reside in the same portion of the markable area and may be placed at a wide range of positions found within the markable areas 17.

It has been found that by appropriately aligning the red LED 20 that red marks or outlines may be formed on card 12 without having those detected by a phototransistor sensor 21. That is, the card contains some 12 data channels which have identical spacings to correspond to the distance between columns on a Hollorith computer card. The timing channel or strobe channel may also be printed in red or black and the light emitting diode in this particular channel is green so that the green light can "identify" the red or black marks used as the timing marks. The 13th channel corresponds to the markings 16 on card 12.

A typical circuit 18 is disclosed that operates with an LED and phototransistor for each row of data detected on card 12, LED 20 emits light to the surface of data card 12 and is reflected back to the phototransistor 21 causing it to conduct. (FIG. 3) Upon conducting, phototransistor 21 pulls an LM 324 operational amplifier 19 input negative resulting in a low output. A diode 22 that appears across the operational amplifier LM-324 will clamp the low output level to approximately minus 0.8 volts. When a black mark 27 is detected on card 12 and passes beneath the sensor 21, the amount of LED light reflected to the phototransistor decreases, causing the collector of the phototransistor 21 to go positive, resulting in a positive output from the LM-324. When a mark such as designated 27 passes the read head, the light reflectance again increases and results in the output of the operational amplifier 19 again going to the low state. Operational amplifier 19 may be of the type sold by the National Semiconductor Corporation of Santa Clara, Calif. 95051.

Turning principally to FIG. 4, the electrical components disclosed in FIG. 3 appear on a pair of circuit boards 23 and 24 with circuit board 24 being held in place within housing 13 by suitable means such as screw. An insert 25 is secured within the read head housing 13 and includes a first bore 26 for excepting LED 20. It will be found that a second bore 30 communicating with bore 26 has parallel sides and converging top and bottom surfaces for converging the light on the markable areas of the card 12 passing thereunder. A plurality of third bores 31 are formed in member 25 and permit sensor 21 to be formed therein. A fourth bore 32 communicating with bore 31 picks up the reflected light from card 12 and passes the reflected light to sensor 21. Each of the fourth bores 32 has four parallel surfaces for collimating the light received from the markable areas of card 12. Thus the light is first converged upon the card and then reflected through the bore that collimates the light to sensor 21.

It will also be observed that the second bore 30 has a partial opening in which the larger orifice is approximately 1.85 times greater than the opening facing the card 12. It will also be observed that the sectional opening in the fourth bore 32 is approximately one-half that of the second bore 30 facing card 12. The second and fourth bores 30 and 32 are separated by an angle of approximately 33° and the card 12 passes in front of the orifices created by the bores so that an axis extending through the second and fourth bores intersects at substantially 0.09 inches forward of the frontal orifices. It will also be determined that the ledge 33 formed between the second and fourth bores 30 and 32 has a thickness of approximately 0.005 to 0.015 inches. Upon converging the light in bore 30 and restricting the light received through the collimating bore 32, a very reliable and workable mechanism has been produced.

FIG. 5 discloses an assembly in which the upper portion of the housing 34 is removed from the lower portion of the housing 35. Card 12 is shown inserted in the front of housing 34 and passes beneath the optical reader 13 as just previously disclosed.

In considering this invention, it should be remembered that the present disclosure is illustrative only and the scope of the invention should be determined by the appended claims.

We claim:

1. An optical card reader comprising:
   (a) a card having boundry markable areas that define the readable portions of code arranged in spaced columns and rows;
   (b) a card driving mechanism for driving said card over a predetermined path of travel;
   (c) a plurality of transversely spaced light sources spatially disposed from said card and driving mechanism, said light sources directing light towards said card at an angle, at least one light being of a color different than the rest;
   (d) a plurality of transversely spaced sensors spatially disposed from said card and driving mechanism, said sensors receiving light reflected normally from said card, at least one sensor receiving light from the color different than the rest, all of said sensors having a state of conducting or non-conducting;
   (e) a read head block over which said card is driven having a plurality of transversely spaced first bores, each bore constructed and arranged to receive one of said plurality of light sources,
   said block having a plurality of transversely spaced second bores communicating with said first bores, said second bores having parallel sides and converging top and bottom surfaces for converging the light on the markable areas of said card,
   said block further having a plurality of transversly spaced third bores, each bore constructed and arranged to receive said plurality of sensors,
   said block also having a plurality of transversely spaced fourth bores, each having four parallel surfaces for collimating the light received from the markable areas of said card, and
   (f) a plurality of operational amplifiers, each being connected to said plurality of sensors to be energized thereby when marks on said card are detected by said plurality of sensors.

2. The structure set forth in claim 1 wherein the plurality of second bores has a partial opening in which the larger orifice is approximately 1.85 times greater than the opening facing said card.

3. The structure set forth in claim 1 wherein the plurality of fourth bores has a sectional opening that is approximately one-half that of said second bore facing said card.

4. The structure set forth in claim 2 wherein the angle between said second and fourth bores resembles 33°.

5. The structure set forth in claim 4 wherein the axis of each of said second and fourth bores intersect substantially 0.090 inches forwardly of the frontal orifices of said bores.

6. The structure set forth in claim 1 wherein the lower and upper surfaces of the orifices of said second and fourth bores are parallel and separated from each other by 0.005 to 0.015 inches.

* * * * *